(12) United States Patent
Ozaki et al.

(10) Patent No.: US 8,197,119 B2
(45) Date of Patent: Jun. 12, 2012

(54) METHOD AND APPARATUS FOR MANUFACTURING POLARIZABLE ELECTRODE FOR ELECTRIC DOUBLE LAYER CAPACITOR

(75) Inventors: Kouki Ozaki, Inuyama (JP); Tatsuhiro Tomioka, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 1056 days.

(21) Appl. No.: 12/124,850

(22) Filed: May 21, 2008

(65) Prior Publication Data

US 2008/0291775 A1 Nov. 27, 2008

(30) Foreign Application Priority Data

May 21, 2007 (JP) ................................ 2007-134080

(51) Int. Cl.
*B01F 3/18* (2006.01)
*B01F 9/08* (2006.01)

(52) U.S. Cl. ........ 366/224; 366/233; 366/185; 366/187; 366/189; 366/348

(58) Field of Classification Search ................. 366/186, 366/187, 189, 224, 233, 348; 264/175
See application file for complete search history.

(56) References Cited

U.S. PATENT DOCUMENTS

| | | | |
|---|---|---|---|
| 2002/0110728 A1* | 8/2002 | Gozdz et al. .................... 429/62 |
| 2004/0170821 A1* | 9/2004 | Iwaida et al. ................... 428/323 |
| 2006/0017188 A1* | 1/2006 | Ishikawara et al. ............. 264/102 |
| 2008/0291775 A1* | 11/2008 | Ozaki et al. ................... 366/186 |

FOREIGN PATENT DOCUMENTS

| | | | |
|---|---|---|---|
| EP | 1130667 A1 | | 9/2001 |
| GB | 1416338 A | | 12/1975 |
| JP | 57127431 A | | 8/2002 |
| JP | 2004-186192 A | * | 7/2004 |
| JP | 3776875 | | 3/2006 |

* cited by examiner

*Primary Examiner* — Tony G Soohoo

(74) *Attorney, Agent, or Firm* — Browdy and Neimark, PLLC

(57) ABSTRACT

There are provided method and apparatus for manufacturing a polarizable electrode for electric double layer capacitor is provided which is capable of preventing porosities, cracks, or breakage of a sheet as much as possible when molding materials are formed into a sheet form and improving the yield of the molding materials. The manufacturing apparatus is used before granulated molding materials that are finely divided and crushed are moved to a calendar molding machine 3. The apparatus includes a mixing machine 1, a vibrating sieve 2, and a vibrating feeder 4. In the mixing machine 1, when the granulated molding materials are mixed with IPA as a binding assistant in a hermetically sealed mixing container 9, they are agitated by agitating blades 11. With this, even when during the mixing, the granulated molding materials adhere with each other to form lumps, the lumps are crushed by the agitation of the agitating blades 11 so that the molding materials are disintegrated into smaller particles. The molding materials mixed with IPA are sieved by the vibrating sieve 2 and conveyed to the calendar molding machine 3 along a conveyance path 30 of the vibrating feeder 4, whereby the molding materials are formed into a sheet form.

6 Claims, 5 Drawing Sheets

METHOD AND APPARATUS FOR MANUFACTURING POLARIZABLE ELECTRODE FOR ELECTRIC DOUBLE LAYER CAPACITOR

BACKGROUND OF THE INVENTION

1. Field of the Invention

The present invention relates to a method and apparatus for manufacturing a polarizable electrode for electric double layer capacitor, which is used when manufacturing the polarizable electrode for electric double layer capacitor.

2. Description of the Related Art

For example, JP-B2-3776875 (see paragraphs 0012, 0016) discloses a technology regarding a method for manufacturing a polarizable electrode for electric double layer capacitor. According to the technology, raw materials including a carbonaceous powder, a conductive assistant, and a binder are mixed and kneaded into kneaded materials, and the kneaded materials are finely divided to obtain molding materials. The molding materials are formed into a sheet form by a calendar molding machine, and the molded sheet is rolled to manufacture an electrode sheet for electric double layer capacitor.

In this case, during a pretreatment process before the molding materials are formed into a sheet form by the calendar molding machine, the finely-divided, granulated molding materials are contained in a container of a mixing machine (mixer) and mixed with binding assistants (for example, IPA (isopropyl alcohol) added thereto. The container has a cylindrical shape and is hermetically sealed. When the container is rotated in the circumferential direction while being swung upward and downward, the materials contained therein are mixed with each other. In this manner, by mixing the granulated molding materials and the binding assistants with each other by using the hermetically sealed container, the binding assistants are not vaporized outside the container, preventing any change in the content ratio. Therefore, the materials contained in the container are mixed as uniform as possible. With this, the quality of the molding materials is stabilized, and it is thus possible to efficiently manufacture a polarizable electrode sheet.

According to the technology disclosed in JP-B2-3776875, when mixing the granulated molding materials and the binding assistants with each other by using the hermetically sealed container, the container is rotated in the circumferential direction while being swung upward and downward. However, the granulated molding materials may sometimes adhere with each other into a lump form. When such molding materials, in which the granulated molding materials are lumped by adhering themselves to each other, are formed into a sheet form by the calendar molding machine, problems such as porosities (voids), cracks, breakage, or swelling of a sheet are caused.

The present invention has been made in view of the problems described above. An object of the present invention is to provide a method and apparatus for manufacturing a polarizable electrode for electric double layer capacitor capable of preventing porosities, cracks, or breakage of a sheet as much as possible when molding materials are formed into a sheet form and improving the yield of the molding materials.

SUMMARY OF THE INVENTION

In order to attain the object described above, according to a first aspect of the present invention, there is provided an apparatus for manufacturing a polarizable electrode for electric double layer capacitor, in which raw materials including a carbonaceous powder, a conductive assistant, and a binder are mixed and kneaded into kneaded materials, the kneaded materials are finely divided to obtain granulated molding materials, the molding materials are formed into a sheet form by a molding machine, the molded sheet is rolled to manufacture a sheet-shaped polarizable electrode for electric double layer capacitor, wherein the apparatus is used before the granulated molding materials are supplied to the molding machine. The apparatus includes a mixing machine having a mixing container that mixes the granulated molding materials with a binding assistant in a hermetically sealed state; and an agitating means, provided in the mixing machine, for agitating the molding materials and the binding assistant contained in the mixing container.

When the granulated molding materials and the binding assistant are mixed with each other in the hermetically sealed mixing container, the molding materials and the binding assistant are agitated by the agitating means. With the agitation, they are physically blown so that they do not form lumps. In this case, even when the granulated molding materials adhere with each other to form lumps, the lumped molding materials are disintegrated into smaller particles by the agitation of the agitating means. Therefore, when the disintegrated molding materials are formed into a sheet form by the molding machine, it is possible to prevent porosities, cracks, or breakage of a sheet as much as possible and to improve the yield of the molding materials. In addition, since the granulated molding materials and the binding assistant are mixed in the hermetically sealed mixing container, it is possible to maintain a uniform content ratio of the binding assistant to the molding materials, thereby further stabilizing the quality of the resulting material.

Among the raw materials of the polarizable electrode, as the carbonaceous power, an activated carbon is mainly used, and other materials such as a carbon nanotube or a fibrous carbon are also usable. As the conductive assistant, a carbon black is mainly used. As the binder, a fluorine resin using PTFE as a starting material is preferable. As the binding assistant, besides the alcohols such as IPA, ethanol, or methanol, ethers, ketones, or the like are also usable.

According to a second aspect of the present invention, the manufacturing apparatus may further include a vibrating sieve that receives the molding materials moved from the mixing container and sieves the molding materials whiling applying vibration to the molding materials. According to this configuration, even when during mixing in the mixing container, there are left the lumped molding materials without being disintegrated into smaller particles, the molding materials are moved to the vibrating sieve and sieved while being applied with vibration, whereby the lumped molding materials are efficiently disintegrated into smaller particles. Therefore, when the molding materials are formed into a sheet form by the molding machine, it is possible to prevent porosities, cracks, or breakage of a sheet in a more efficient manner.

According to a third aspect of the present invention, the manufacturing apparatus may further include a connecting duct that is provided at a portion of the vibrating sieve where the molding materials in the mixing container are moved to the vibrating sieve, the connecting duct covering the surroundings of a portion where the molding materials are passed. According to this configuration, when the molding materials in the mixing container are moved to the vibrating sieve, it is possible to prevent escape of the binding assistant attached to the molding materials to the outside as much as possible. Accordingly, it is possible to maintain a uniform content ratio of the binding assistant to the molding materials, thereby further stabilizing the quality of the resulting material.

According to a fourth aspect of the present invention, the manufacturing apparatus may further include a vibrating feeder having a conveyance path along which the molding materials sieved by the vibrating sieve are conveyed to the molding machine. According to this configuration, as a means for conveying the molding materials sieved by the vibrating sieve to the molding machine, the vibrating feeder is used which conveys the molding materials while applying vibration to the molding materials. Therefore, during the conveyance, it is possible to disintegrate the lumped molding materials. Therefore, when the molding materials are formed into a sheet form by the molding machine, it is possible to prevent porosities, cracks, or breakage of a sheet in a more efficient manner.

According to a fifth aspect of the present invention, the conveyance path may have a tube-like shape of which the perimeter is surrounded, and the manufacturing apparatus may further include a connecting duct that is provided at a portion of the conveyance path where the molding materials sieved by the vibrating sieve are moved to the conveyance path, the connecting duct covering the surroundings of a portion where the molding materials are passed. According to this configuration, in the portion of the vibrating sieve where the molding materials sieved by the vibrating sieve are moved to the conveyance path and during conveyance along the conveyance path, it is possible to prevent escape of the binding assistant attached to the molding materials to the outside as much as possible. Accordingly, it is possible to maintain a uniform content ratio of the binding assistant to the molding materials, thereby further stabilizing the quality of the resulting material.

According to a sixth aspect of the present invention, the manufacturing apparatus may further include a connecting duct that is provided at a portion of the molding machine where the molding materials on the conveyance path are moved to the molding machine, the connecting duct covering the surroundings of a portion where the molding materials are passed. According to this configuration, during conveyance of the molding materials to the molding machine along the conveyance path of the vibrating feeder, it is possible to prevent escape of the binding assistant attached to the molding materials to the outside as much as possible. Accordingly, it is possible to maintain a uniform content ratio of the binding assistant to the molding materials, thereby further stabilizing the quality of the resulting material.

According to a seventh aspect of the present invention, there is provided a method for manufacturing a polarizable electrode for electric double layer capacitor, in which raw materials including a carbonaceous powder, a conductive assistant, and a binder are mixed and kneaded into kneaded materials, the kneaded materials are finely divided to obtain granulated molding materials, the molding materials are formed into a sheet form, the molded sheet is rolled to manufacture a sheet-shaped polarizable electrode for electric double layer capacitor, wherein the method is used before the granulated molding materials are formed into the sheet form. The method includes mixing and kneading the granulated molding materials with a binding assistant in a hermetically sealed state.

When the granulated molding materials and the binding assistant are mixed with each other in the hermetically sealed state, the molding materials and the binding assistant are agitated. With the agitation, they are physically blown so that they do not form lumps. In this case, even when the granulated molding materials adhere with each other to form lumps, the lumped molding materials are disintegrated into smaller particles. Therefore, when the disintegrated molding materials are formed into a sheet form by the molding machine, it is possible to prevent porosities, cracks, or breakage of a sheet as much as possible and to improve the yield of the molding materials. In addition, since the granulated molding materials and the binding assistant are mixed in the hermetically sealed state, it is possible to maintain a uniform content ratio of the binding assistant to the molding materials, thereby further stabilizing the quality of the resulting material.

By using the manufacturing apparatus according to any one of the first to sixth aspect of the present invention, it is possible to particularly efficiently manufacture granulated molding materials.

DESCRIPTION OF THE PREFERRED EMBODIMENTS

Figure 3:
FIG. 3 is an explanatory diagram of the process steps for manufacturing an electrode sheet for electric double layer capacitor.

Hereinafter, embodiments of the present invention will be described with reference to the drawings. FIG. 3 shows the process steps for manufacturing an electrode sheet for electric double layer capacitor. Raw materials used in manufacturing a polarizable electrode include an activated carbon as a carbonaceous powder, a carbon black as conductive assistants, a PTFE powder as a binder, and a liquefied IPA (isopropyl alcohol) as binding assistants. As for the mixing ratio of the raw materials, the activated carbon, the carbon black and the PTFE are in the ratio of, by mass %, 80:10:10 in their solid state. IPA is added by the same amount as the amount of PTFE.

Figure 4A:
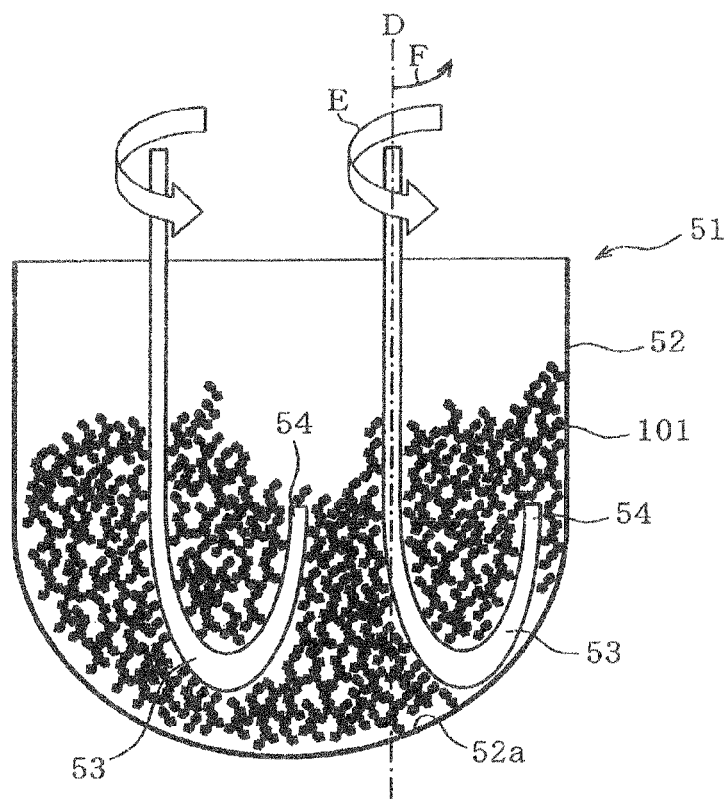
FIG. 4A is a vertical sectional view showing a general construction of a mixing and kneading machine.

First, the individual raw materials are subjected to measurement. Then, the raw materials (activated carbon, carbon black, PTFE, and liquefied IPA) are put into a container 52 of a mixing and kneading machine 51 shown in FIG. 4a, where the raw materials 101 are mixed and kneaded with each other by the mixing and kneading machine 51 (a mixing and kneading step).

Figure 4B:
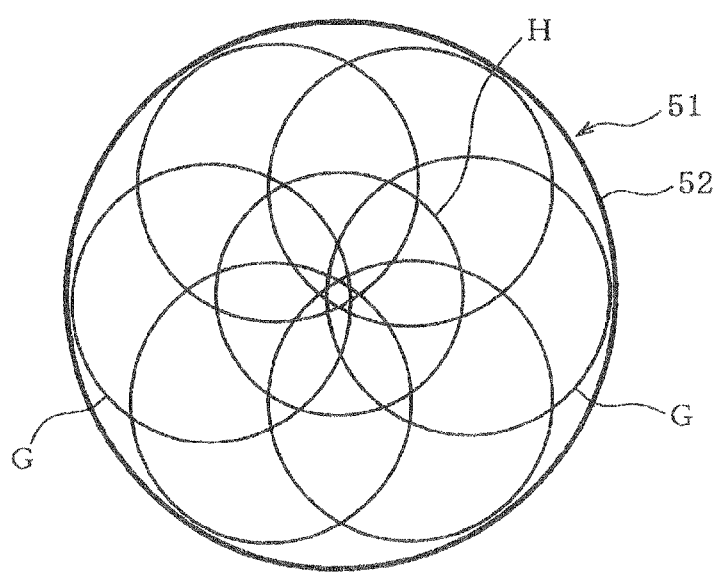
FIG. 4B is a top view showing an example of the trajectory of an agitator.

Specifically, the mixing and kneading machine 51 is referred to as a planetary mixer, in which an inner bottom surface 52a of the container 52 has a concave, sphere surface shape. In the container 52, two, J-shaped agitators 53 are arranged such that they rotate in the arrow E direction about a rotation shaft D in a synchronized manner while revolving in the arrow F direction within the container 52. FIG. 4B shows examples of the trajectory G of distal ends 54 of the agitators 53 and the trajectory H of the rotation shaft D of the agitators 53.

Once the raw materials 101 are put into the container 52, the two agitators 53 start rotating and revolving. Then, the raw materials 101 are dispersed to the entire areas of the container 52 as uniform as possible by the rotation and revolution of the agitators 53. At the same time, the mixed raw materials 101 are grinded and kneaded between the perimeters of the distal ends 54 of the agitators 53 and the inner surface of the container 52. With this, fibrillation of the PTFE is accelerated, whereby the activated carbon and the carbon black are entangled by the PTFE into a clay form. In this way, the mixing and kneading of the raw materials 101 are collectively performed in the container 52 of the mixing and kneading machine 51.

During the mixing and kneading step, according to the needs, the mixing and kneading of the raw materials 101 may be performed in a state that a pre-kneaded material is put into the container 52. When the pre-kneaded material is put, with the rotation of the agitators 53, the pre-kneaded material embraces other raw materials 101, whereby the raw materials 101 are easily mixed and kneaded around the kneaded material. With this, it is possible to shorten the time for mixing and kneading the raw materials 101. In this case, the amount of the kneaded material to be put is preferably in the range of about 5 to about 30% by mass of the entire raw materials.

Figure 5A:
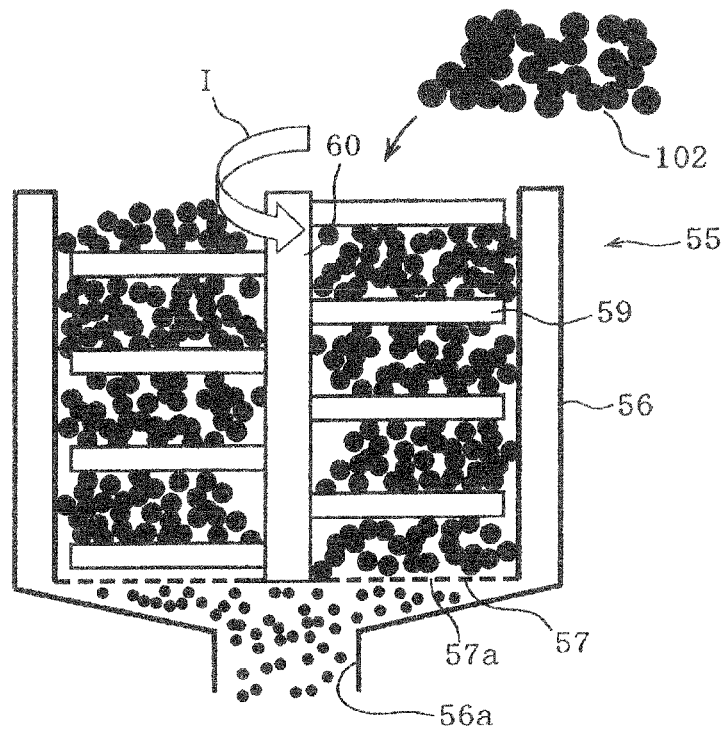
FIG. 5A is a vertical sectional view showing a general construction of a crushing and classifying machine.
Figure 5B:
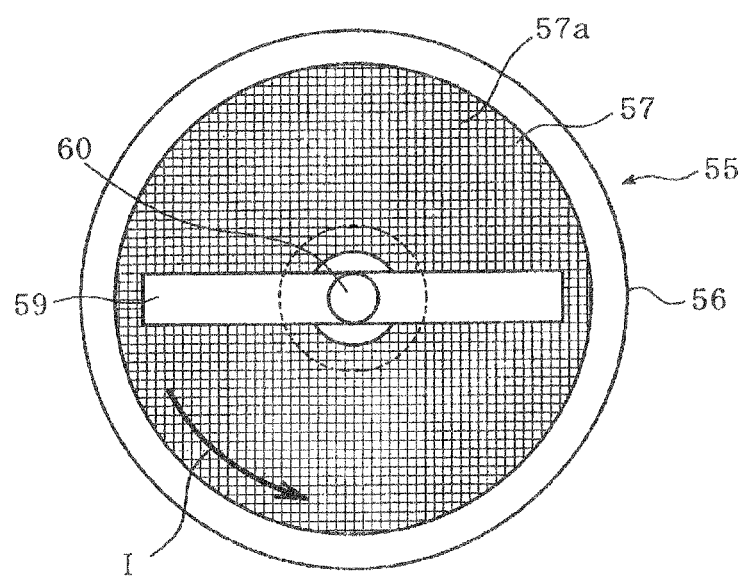
FIG. 5B is a top view of the grinding and classifying machine.

Once the mixing and kneading step is completed, the kneaded material 102 is put into a guide 56 of a crushing and classifying machine 55 shown in FIG. 5, whereby the crushing and classification of the kneaded material 102 are collectively performed in the crushing and classifying machine 55 (a crushing and classifying step).

Specifically, the guide 56 of the crushing and classifying machine 55 has a container shape, in which an opening 56a is formed at the lower end thereof. In the lower part of the guide 56, a mesh 57 is arranged above the opening 56a. In this case, the size of holes 57a of the mesh 57 is set to about 1.0 mm. Within the guide 56, agitators 59 are arranged to be rotatable in the arrow I direction about a shaft 60.

Once the kneaded material 102 is put into the crushing and classifying machine 55, the agitators 59 are rotated. Then, the kneaded material 102 is crushed and grinded by the rotation of the agitators 59 so as to be finely divided. The finely grinded crushed material passes through the holes 57a of the mesh 57 and falls from the opening 56a of the guide 56 to be received and stored in a container (not shown) provided below the opening 56a. The materials stored in this container are used as a molding material.

Figure 1:
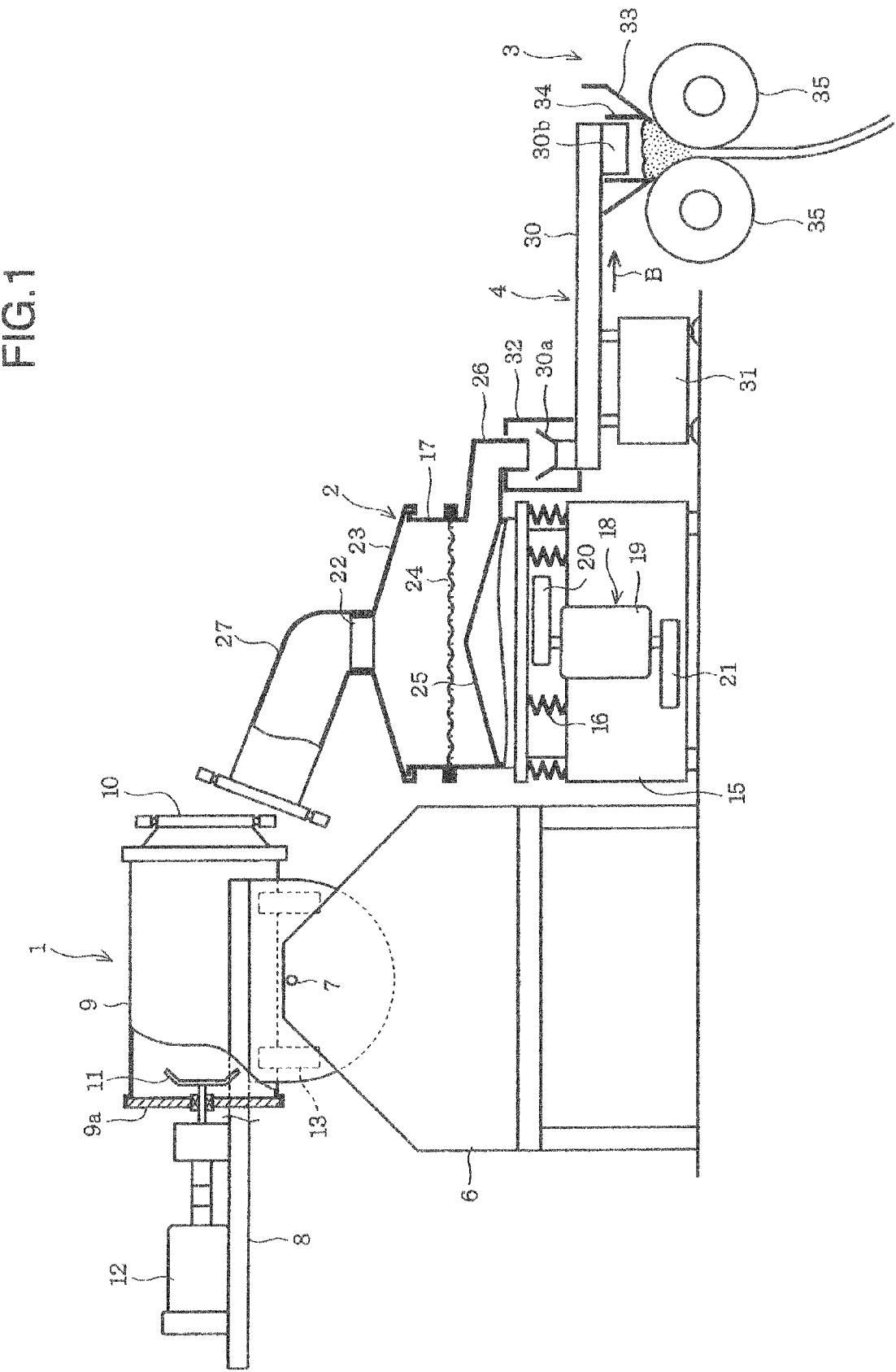
FIG. 1 is a cut-away front view of an embodiment of the present invention.
Figure 2B:
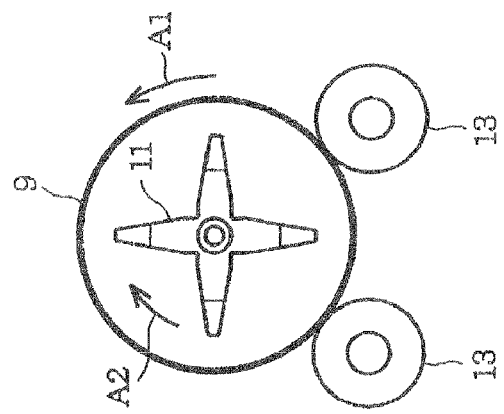
FIG. 2B is a vertical sectional side view for explaining a rotation direction of a mixing container and an agitating blade.

Next, a calendar molding pretreatment step is performed. The calendar molding pretreatment step will be described with reference to FIGS. 1 and 2. An apparatus used in the calendar molding pretreatment step is the manufacturing apparatus of the present invention.

The apparatus of the present invention includes a mixing machine 1 that mixes a molding material and a binding assistant, a vibrating sieve 2 that sieves the molding materials mixed by the mixing machine 1, and a vibrating feeder 4 that conveys the molding materials sieved by the vibrating sieve 2 to a calendar molding machine 3.

The mixing machine 1 has a support table 6, a swing board 8 that is supported above the support table 6 so as to be swingable about a swing center 7, and a mixing container 9 having a substantially cylindrical shape provided to the swing board 8. One end of the mixing container 9 is closed by an end plate 9a, and a cap 10 that opens and closes an input/output port is provided at the other end so that the mixing container 9 is hermetically sealable. Within the mixing container 9, agitating blades 11 that constitute an agitating means are arranged close to the end plate 9a. The agitating blades 11 are rotated by an agitating motor 12 disposed outside the mixing container 9. The agitating motor 12 is attached on the swing board 8. The mixing container 9 is rotated in the circumferential direction by a roller 13 (FIG. 2B) provided to the swing board 8.

The vibrating sieve 2 has a base frame 15, a sieve frame 17 that is elastically supported on the base frame 15 via a spring 16, and a vibration generating mechanism 18 provided below the sieve frame 17. The vibration generating mechanism 18 includes a vibration motor 19 of which the rotation shaft protrudes both upward and downward, an upper unbalance weight 20 attached to the upper rotation shaft of the vibration motor 19, and a lower unbalance weight 21 attached to the lower rotation shaft of the vibration motor 19. The upper and lower unbalance weights 20 and 21 are configured such that the weights are unbalanced with respect to the rotation center. When the upper and lower unbalance weights 20 and 21 are rotated by the vibration motor 19, vibration is generated and transmitted to the sieve frame 17.

An upper cap 23 having an input port 22 is attached to the upper portion of the sieve frame 17. A sieve net 24 is provided within the sieve frame 17, and a receiver portion 25 having a conical shape is provided below the sieve net 24. On the outer periphery of the sieve frame 17, an output port 26 is provided on the lateral side of the receiver portion 25. A connecting duct 27 is fitted to the input port 22.

The vibrating feeder 4 has a conveyance path 30 and an electromagnetic vibration generating portion 31. The conveyance path 30 extends in the horizontal direction of FIG. 1 and has a rectangular tube-like shape with a rectangular cross-section. An input port 30a that is turned upward is provided at the left end of the conveyance path 30, and an output port 30b that is turned downward is provided at the right end of the conveyance path 30. The input port 30a of the conveyance path 30 is disposed below the output port 26 of the vibrating sieve 2. A connecting duct 32 is provided around the output port 26 and the input port 30a so as to cover the surroundings. The output port 30b of the conveyance path 30 is disposed to oppose a hopper 33 of the calendar molding machine 3 from the above. Within the hopper 33, a connecting duct 34 is provided so as to cover the surroundings of the output port 30b of the conveyance path 30.

The calendar molding machine 3 includes two roller 35 and 35 and is configured such that when the molding materials are passed between the rollers 35 and 35, the molding materials are formed into a sheet form.

Figure 2A:
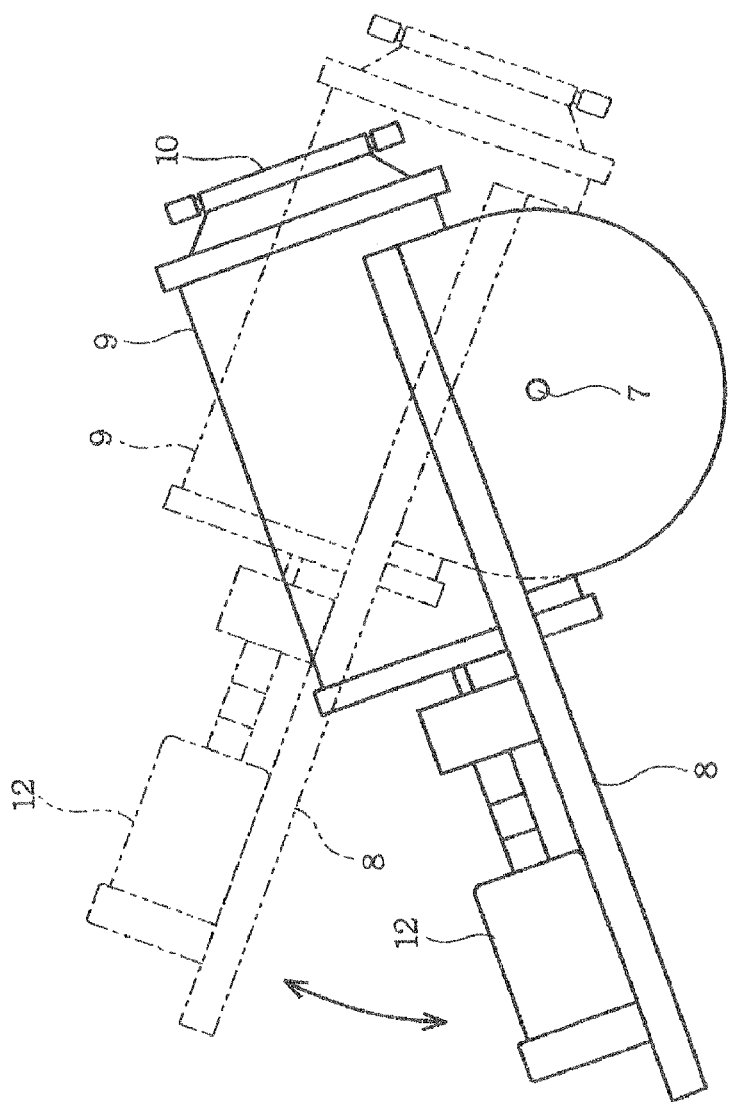
FIG. 2A is a front view for explaining a swing operation of a mixing container.

In the construction described above, the mixing machine 1 is used to mix the classified molding materials with IPA as the binding assistant. Specifically, the granulated molding materials are stored in the mixing container 9 with the liquefied IPA as the binding assistant added thereto, and then the mixing container 9 is hermetically sealed. In this case, the amount of the added IPA is set to 70% of the total mass of the raw materials (activated carbon, carbon black, and PTFE), for example. Then, the mixing container 9 is rotated by the roller 13 in the arrow A1 direction of FIG. 2B. At the same time, as shown in FIG. 2A, the mixing container 9 is swung upward and downward about the swing center 7 by a driving means (not shown), whereby the molding materials and the IPA are mixed in the mixing container 9. In addition, the agitating blades 11 are rotated by the agitating motor 12 in the arrow A2 direction of FIG. 2B, which is opposite to the rotation direction of the mixing container 9. Then, the molding materials and the IPA in the mixing container 9 are agitated by the agitating blades 11.

Even when during the mixing in the mixing container 9, the granulated molding materials adhere with each other to form lumps, the lumps are crushed by the agitation of the agitating blades 11 so that the molding materials are disintegrated into smaller particles. By the mixing of the mixing machine 1 and the agitation of the agitating blades 11, the granulated molding materials and the IPA contained in the hermetically sealed mixing container 9 are mixed with each other as uniform as possible.

After the mixing of the mixing machine 1 is performed for a predetermined period, the rotation and swing of the mixing container 9 and the rotation of the agitating blades 11 are stopped. Thereafter, the molding materials in the mixing container 9 are moved to the vibrating sieve 2. In this case, the cap 10 of the mixing container 9 is opened and the mixing container 9 is inclined so that the input/output port of the mixing container 9 is connected to the connecting duct 27. In such a state, the molding materials in the mixing container 9 are put into the sieve frame 17 of the vibrating sieve 2 through the input port 22.

In the vibrating sieve 2, the upper and lower unbalance weights 20 and 21 are rotated by the vibrating motor 19, thereby generating vibration. The molding materials moved to the sieve frame 17 are sieved by the vibration transmitted to the sieve net 24 and passed through net meshes of the sieve net 24 to be received by the receiver portion 25. At this time, even when the molding materials moved to the sieve frame 17 adhere with each other to form lumps, the molding materials are sieved at the sieve net 24 so that the molding materials are disintegrated into smaller particles. The molding materials received at the receiver portion 25 are sequentially fallen from the output port 26 to the input port 30$a$ of the conveyance path 30 of the vibrating feeder 4.

The molding materials fell into the input port 30$a$ of the conveyance path 30 are conveyed along the conveyance path 30 in the arrow B direction while receiving the vibration generated by the vibration generating portion 31 and finally put into the hopper 33 of the calendar molding machine 3 from the output port 30$b$. The molding materials put into the hopper 33 are formed into a sheet form by the calendar molding machine 3. The sheet-shaped molding material is wound around a winding roller (not shown). In this case, the thickness of the sheet-shaped molding material is controlled to about 200 μm, for example.

Next, in a roll pressing step (FIG. 3), the sheet-shaped molding material is rolled between two rollers. By repeating this roll pressing step several times, a sheet-shaped electrode having a predetermined thickness of 160 μm, for example, is obtained as a polarizable electrode. In the final roll pressing step, both ends in the width direction of the sheet-shaped electrode are cut by a cutter.

Next, in a laminating step, the rolled sheet-shaped electrode is bonded to an aluminum foil serving as a collector electrode. The bonded electrode sheet is wound around a winding roller.

Next, in a drying step, moisture and residual IPA contained in the sheet-shaped electrode is removed. In this case, a vacuum drying may be performed in accordance with the needs. In this way, a polarizable electrode for electric double layer capacitor is manufactured.

According to the embodiment described above, the following advantages are provided.

In the calendar molding pretreatment step, when the granulated molding materials and IPA as the binding assistant are mixed with each other in the hermetically sealed mixing container 9, the molding materials and the IPA are agitated by the agitating blades 11. According to this configuration, even when in the mixing container 9, the granulated molding materials adhere with each other to form lumps, the lumped molding materials are disintegrated by the agitation of the agitating blades 11. Therefore, when the disintegrated molding materials are formed into a sheet form by the molding machine 3, it is possible to prevent porosities, cracks, or breakage of a sheet as much as possible and to improve the yield of the molding materials. In addition, since the granulated molding materials and the IPA are mixed in the hermetically sealed mixing container 9, it is possible to maintain a uniform content ratio of the IPA to the molding materials, thereby further stabilizing the quality of the resulting material.

The granulated molding materials mixed in the mixing container 9 of the mixing machine 1 are moved to the vibrating sieve 2 and are then sieved by the vibrating sieve 2 while being applied with vibration. According to this configuration, even when during mixing in the mixing container 9, there are left the lumped molding materials without being disintegrated into smaller particles, the molding materials are sieved by the vibrating sieve 2 while being applied with vibration, whereby the lumped molding materials are efficiently disintegrated into smaller particles. Therefore, when the molding materials are formed into a sheet form by the calendar molding machine 3, it is possible to prevent porosities, cracks, or breakage of a sheet in a more efficient manner.

The connecting duct 27 is provided at a portion of the vibrating sieve 2 where the molding materials in the mixing container 9 are moved to the vibrating sieve 2, the connecting duct 27 covering the surroundings of a portion where the molding materials are passed. According to this configuration, when the molding materials in the mixing container 9 are moved to the vibrating sieve 2, it is possible to prevent escape of the IPA attached to the molding materials to the outside as much as possible. Accordingly, it is possible to maintain a uniform content ratio of the IPA to the molding materials, thereby further stabilizing the quality of the resulting material.

The molding materials sieved by the vibrating sieve 2 are conveyed by the vibrating feeder 4 to the calendar molding machine 3. According to this configuration, even during the conveyance of the molding materials from the vibrating sieve 2 to the calendar molding machine 3, it is possible to disintegrate the lumped molding materials. Therefore, when the molding materials are formed into a sheet form by the calendar molding machine 3, it is possible to prevent porosities, cracks, or breakage of a sheet in a more efficient manner.

In the vibrating feeder 4, the conveyance path 30 has a tube-like shape of which the perimeter is surrounded, and the manufacturing apparatus includes the connecting duct 32 that is provided at a portion of the conveyance path 30 where the molding materials sieved by the vibrating sieve 2 are moved to the conveyance path 30, the connecting duct 32 covering the surroundings of a portion where the molding materials are passed. According to this configuration, in the portion of the vibrating sieve 2 where the molding materials sieved by the vibrating sieve 2 are moved to the conveyance path 30 and during conveyance along the conveyance path 30, it is possible to prevent escape of the IPA attached to the molding materials to the outside as much as possible. Accordingly, it is possible to maintain a uniform content ratio of the IPA to the molding materials, thereby further stabilizing the quality of the resulting material.

The manufacturing apparatus includes the connecting duct 34 that is provided at a portion of the calendar molding machine 3 where the molding materials on the conveyance path 30 are moved to the molding machine 3, the connecting duct 34 covering the surroundings of a portion where the molding materials are passed. According to this configuration, during conveyance of the molding materials to the calendar molding machine 3 along the conveyance path 30 of the vibrating feeder 4, it is possible to prevent escape of the IPA attached to the molding materials to the outside as much as possible. Accordingly, it is possible to maintain a uniform content ratio of the IPA to the molding materials, thereby further stabilizing the quality of the resulting material.

The invention claimed is:

1. A method for manufacturing a polarizable electrode for electric double layer capacitor, in which raw materials including a carbonaceous powder, a conductive assistant, and a binder are mixed and kneaded into kneaded materials, the kneaded materials are finely divided to obtain granulated molding materials, the molding materials are formed into a sheet form, the molded sheet is rolled to manufacture a sheet-shaped polarizable electrode for electric double layer capacitor, wherein the method is used before the granulated molding materials are formed into the sheet form, the method comprising the steps of:

containing the granulated molding materials and the binding assistance in a container;

hermetically sealing the container to place the container in a hermetically sealed state; and mixing by rotating the hermetically sealed container while agitating by agitating blades the granulated molding materials with a binding assistant in a hermetically sealed state in the hermetically sealed container.

2. The method for manufacturing a polarizable electrode for electric double layer capacitor according to claim 1, the method further comprising the steps of:

moving the mixed and agitated molding materials to a vibrating sieve; and passing the molding materials through the vibrating sieve while applying vibration to the molding materials.

3. The method for manufacturing a polarizable electrode for electric double layer capacitor according to claim 1, wherein the molding materials are moved in a covered connecting duct in the step of moving the molding materials to the vibrating sieve.

4. The method for manufacturing a polarizable electrode for electric double layer capacitor according to claim 1, further comprising the steps of:

moving the sieved molding materials to a conveyance path for conveying the molding materials to a molding machine; and conveying the molding materials to the molding machine while vibrating the molding materials.

5. The method for manufacturing a polarizable electrode for electric double layer capacitor according to claim 1, wherein the step of moving the sieved molding materials to the conveyance path comprises passing the sieved molding materials through an output port of the vibrating sieve to an input port of the conveyance path within a covered connecting duct that covers at least a portion of the output port of the of the vibrating sieve an at least a portion of the input port of the conveyance path.

6. The method for manufacturing a polarizable electrode for electric double layer capacitor according to claim 1, wherein the step of conveying the molding materials to the molding machine comprises conveying the molding materials through a tube-like shape covered conveyance path to the molding machine.

* * * * *